(12) United States Patent
Lysdal et al.

(10) Patent No.: US 6,438,178 B1
(45) Date of Patent: *Aug. 20, 2002

(54) INTEGRATED CIRCUIT FOR RECEIVING A DATA STREAM

(75) Inventors: Henning Lysdal, Roskilde; Michael Liere, Valby; Henrik Ingvar Johansen, Ballerup, all of (DK)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/373,080

(22) Filed: Aug. 11, 1999

(51) Int. Cl.[7] .......................... H04L 25/06; H04L 25/10
(52) U.S. Cl. ..................... 375/317; 375/354; 327/307
(58) Field of Search ................. 375/317, 346, 375/229, 232, 354, 326, 350; 327/307

(56) References Cited

U.S. PATENT DOCUMENTS 4,700,357 A * 10/1987 Ast ........................ 375/214
4,795,919 A   1/1989 Tanikoshi et al.
6,047,032 A * 4/2000 Zortea et al. ............. 375/317

FOREIGN PATENT DOCUMENTS

| EP | 0284279 A1 | 9/1988 |
|---|---|---|
| EP | 0667533 A2 | 8/1995 |
| GB | 2301723 A  | 12/1996 |

* cited by examiner

Primary Examiner—Chi Pham
Assistant Examiner—Phuong Phu
(74) Attorney, Agent, or Firm—Blakely, Sokoloff, Taylor & Zafman LLP

(57) ABSTRACT

An integrated circuit for receiving and recovering an incoming electrical signal of a digital data bit stream transmitted over a communication channel, and comprising an equaliser circuit adapted to reshape the electrical signal to be provided to, a CDR circuit adapted to receive the reshaped electrical signal and to recover data bit signal of the digital bit stream and to recover a clock signal encoded or embedded in the digital data stream.

35 Claims, 6 Drawing Sheets

INTEGRATED CIRCUIT FOR RECEIVING A DATA STREAM

FIELD OF THE INVENTION

The present invention relates to an integrated circuit for receiving and recovering a digital data bit stream which has been transmitted over a communication channel, such as a 140–155 Mbit/s Code Mark Inversion (CMI) digital data bit stream transmitted over communication channels operating according to E4/STM-1/OC-3 protocols. The integrated circuit may comprise a cable equaliser circuit, a Loss of Signal (LOS) detection circuit and a Clock and Data Recovery circuit to provide a single-chip interface solution for reception of high speed digital data bit streams.

The present invention also relates to a LOS detection circuit which is capable of accurately detecting a presence or absence of the incoming electrical signal by monitoring a level of the received digital data bit stream on a bit by bit basis and compare the level of each of the received data bits to a predetermined threshold value or values. The present LOS detection circuit may furthermore be adapted to comply with LOS defect specifications defined by the ITU-T G. 703 standard for 140–155 Mbit/s system bit rates by counting a number of data bit periods of the digital data bit stream and detect how many of those data bit periods that contained signal levels larger than an upper threshold value and/or smaller than a lower threshold value.

BACKGROUND OF THE INVENTION

In high speed digital communication systems, it is important to be able to rapidly and reliably determine the loss of a incoming electrical signal transmitted to a receiver circuit over the communication channel of a communication system. Accordingly, receiver chip sets or chips are often provided with circuitry which is adapted to monitor a signal level of the incoming electrical signal of the digital data bit stream or data stream to determine whether the data stream is present or not and provide a LOS defect signal indicating whether the data stream is present or absent. Often, this LOS defect signal is transferred to a system processor or network controller, i.e. Personal Computer or workstation running a suitable monitoring program, monitoring the operation of the communication system, which may be adapted to e.g. shut down the system in response to an activated LOS defect signal.

Accordingly, although the receiver chip must respond rapidly to a true loss event, it must not activate the LOS defect signal in response to minor LOS events constituted by allowed variations or fluctuations in the level of incoming electrical signal or by short duration random noise pulses or bursts. Allowed variations in the received signal level are often defined in technical standards, such as ITU-T G.775 that defines a number of criteria for activation and clearance of the LOS defect signal based on the level of the incoming electrical signal. Avoiding unintended shutdowns due to the previously mentioned minor LOS events require very precise control of a level detector's threshold value or values in the LOS detector circuit. Furthermore, a LOS detector operating according to ITU-T G.775 should also be capable of determining and counting for how many data bit periods, of a recovered data stream the incoming electrical signal level is below or above the threshold value(s). By providing a such count value and basing a decision as to whether the incoming electrical signal is present or not, i.e. whether the LOS defect signal should be activated or cleared, it may be avoided that the LOS circuit reacts instantaneously to the above-mentioned minor LOS events. Instead well-defined criteria in terms of a threshold value(s) of the level of the incoming electrical signal and the duration, counted in data bit periods, of such minor LOS events can be provided and utilised as a decision basis for a network controller controlling a state of the LOS defect signal.

Many known LOS detection circuits use a peak detector to convert an incoming AC signal of a data stream to a e.g. proportional DC value which can be compared to a predetermined threshold voltage to determine when the incoming AC signal level has fallen below a predetermined threshold value. Examples of circuits operating according to such principles are known from U.S. Pat. No. 4,795,919 and GB 2 301 723. The peak detectors disclosed in those references use integrated transistors, diodes and resistors, but usually external capacitors to generate the required DC signal that represents the peak value of the incoming signal. There are several drawback associated with this level detecting methodology. The external capacitor which provides the required DC value of the incoming signal also introduces some uncertainty to the time constants of the detector circuit due to an inherent tolerance on the capacitor's value and its lack of tracking with inherent variations in integrated component's resistance and transconductance values. For high speed data signal, such as data rates above 140 Mbit/s, parasitic capacitance and inductance associated with the integrated circuit's (IC's) package and bonding wires makes the resulting time constant of such partly internal and partly external peak detecting circuit even less well defined. EP 0 667 533 discloses a LOS detector circuit for detecting LOS events of an incoming signal. The LOS detector circuit comprise a pair of comparators that compare a level of an incoming signal to predetermined threshold voltages to determine if the signal level is within a predetermined voltage range defined by the threshold voltages. Comparator output signals are processed and transferred to a "smearing circuit" that combines the input signal of the smearing circuit with successively delayed versions of the same signal in an AND gate. Accordingly, only LOS events of incoming signals that have a duration longer than the total delay path are detected as true minor LOS events at the output of the smearing circuit. The delay time of the delay path is adjusted to be equivalent to about one data bit period of the incoming signal to avoid short noise burst or similar short time signal corruption to trigger or activate a LOS defect signal. This LOS detector circuit is not capable of reliably detecting incoming electrical signals wherein the signal level is sufficiently low to only rise above the thresholds voltage(s) in short time periods, a situation often encountered during reception of electrical signals which have been transmitted over an electrical cable, since such signals are attenuated and have a substantially triangular waveform shape. Furthermore, the required adjustment of the delay time of the delay path to match each data bit rate that needs to be supported and the very poor control over the absolute delay time of inverter elements on integrated circuits are both impractical.

SUMMARY OF THE INVENTION

It is an object of one embodiment of the invention to provide a single integrated circuit that comprises a cable equaliser circuit, a LOS detection circuit and a CDR circuit to obtain a single chip solution for receiving and retrieving an incoming electrical signal of a data stream and for controlling a state of the LOS defect signal in accordance with predetermined criteria as to the required signal level of the incoming electrical signal and to the duration of LOS events in the electrical signal. is also an object of the invention to provide a LOS detection circuit that may be adapted to comply with the ITU-T G.775 specification for generation of LOS defect signals.

It is further an object of the invention to provide a LOS detection circuit that is capable of reliably detecting the presence or absence of a low level electrical signal comprising data bits with a substantially triangular signal wave shape due to the transmission over an electrical cable based communication channel.

It is further an object of the invention to provide a LOS detection circuit capable of comparing the level of consecutive data bits within the received data stream on a bit by bit basis to a predetermined threshold voltage(s).

It is further an object of the invention to provide a LOS detection circuit that is capable of providing flexible criteria for activation and clearance of the LOS defect signal. According to one embodiment of the invention, this has been accomplished by comparing the level of each data bit in the received data stream with the predetermined threshold voltages and determine the number of data bits that have a level larger than an upper threshold voltage or smaller than a lower threshold voltages.

DESCRIPTION OF THE INVENTION

A first aspect of the invention relates to an integrated circuit for receiving and recovering an incoming electrical signal of a digital data bit stream transmitted over a communication channel, and comprising
- an equaliser circuit adapted to reshape the electrical signal to be provided to,
- a CDR circuit adapted to receive the reshaped electrical signal and to recover a data bit signal of the digital data bit stream and to recover a clock signal encoded or embedded in the digital data stream.

The incoming electrical signal may be applied on a single terminal or on two terminals of the integrated circuit as a single ended or differential input signal, respectively. Preferably, the incoming signal is AC coupled to the input terminal(s) through a suitable pulse transformer or a capacitor. The equaliser circuit is adapted to receive the incoming electrical signal and reshape the data bits of the received data stream so as to provide a voltage level of a data stream signal compatible to the required voltage level of the type of logic gates that are utilised within the CDR circuit.

Previous problems relating to integrating the equaliser circuit together with the CDR circuit has been avoided according to the present invention by using fully balanced signal processing and symmetrical layout techniques for both sensitive analogue circuit blocks comprised within the equaliser circuit and for all logic gates and other digital circuit blocks and a PLL circuit within the CDR circuit. Furthermore, a dedicated and separate power supply net, ground net and associated external terminals are provided for digital circuitry as well as for the sensitive analogue circuit blocks. Finally, dedicated ground nets and an external terminal are also provided for guard rings surrounding the sensitive analogue circuit blocks. Accordingly, it has been possible to place the sensitive analogue equaliser circuit adapted to receive the commonly very low level incoming electrical signals on the same die as the high level digital clock and data signals within the CDR circuit.

The integrated circuit may further comprise LOS detection circuit adapted to monitor levels of the incoming electrical signal and further adapted to control a state of a LOS defect signal indicating absence or presence of the digital data bit stream. The LOS defect signal is preferably provided as a single ended CMOS compatible signal on an externally accessible pin or terminal of the integrated circuit. This solution provides a simple interface to a CMOS based system processor adapted to handle an activated LOS defect signal according to a set of predetermined rules. The system processor may be adapted to respond to an activated LOS defect signal by generating a request for retransmission of a received data sequence or packet and/or re-route the data sequence or packet to another, operative, communication channel. Where the incoming electrical signal has been derived from an optical signal transmitted over an optical communication channel, the system processor may be adapted to rapidly shut down the transmission system including active laser light transmitters to avoid that a broken fibre optical cable causes harmful emission of laser light to someone positioned nearby.

Known problems related to the integration of a LOS detection circuit on the same die as the equaliser circuit and the CDR circuit has been avoided by the previously mentioned balanced signal processing techniques and symmetrical layout techniques and the dedicated power supply nets to provide isolation between sensitive analogue circuit blocks within the equaliser and LOS detection circuits and the digital circuit blocks. A fully integrated LOS detection circuit (no external components are required) has further been provided by integrating a bipolar bandgap reference circuit that provides tightly matched current sources which are utilised to generate accurate threshold voltages for the comparator means.

According to one embodiment of the invention, the integrated circuit is adapted to receive the data stream from an optical cable based communication channel. Since the integrated circuit according to the present invention must have an electrical incoming signal applied to the input terminal(s), a photo-diode converting the optical signal to a corresponding electrical signal may be utilised as a front-end to the integrated circuit. In this situation, the signal waveform of individual data bits of the incoming electrical signal will usually have a smeared or broadend appearance due to dispersion and non-linearity introduced into the data bits of the received data stream during transmission in the optical cable. The task of the equaliser circuit is, in this situation, to re-shape the waveform of the individual data bits to make the data stream compatible with the logic circuitry which is adapted to process the received data stream. For signal reception over an optical communication channel, the CDR circuit is preferably adapted to recover the data and the clock signal of a Non Return to Zero (NRZ) or a Return to Zero (RZ) encoded digital data stream.

According another embodiment of the invention, the integrated circuit is adapted to receive the digital data stream from an electrical cable communication channel. In this situation, the received electrical signal level is usually low, i.e. 10–40 dB below a nominal signal level and the waveforms of the individual data bits in the data stream is of a triangular shape due to frequency dependent losses introduced by the electrical cable during transmission. Consequently, the task of the equaliser circuit in this embodiment of the invention is to amplify and re-shape the signal waveform of the individual data bits to make them compatible with the logic circuitry of the data and clock recovery circuit adapted to further process the data stream. The CDR circuit is preferably adapted to recover the data and the clock signal of a digital data bit stream encoded according to Coded Mark Inversion (CMI) coding or scrambled NRZ coding that makes the coded data stream DC free such as 8b/10b, 4b/5b coding, etc. These codes provides data streams that posses a long-term DC value of zero (assuming that the midpoint between the two logic levels of a data bit is zero), so that such encoded data streams are readily transmitted through circuit elements acting as bandpass or highpass filters, e.g. pulse transformers or coupling capacitors, respectively. According to a preferred embodiment of the invention, the integrated circuit is adapted to receive a CMI encoded digital data bit stream according to the ITU-T G. 703 specification for 140–155 Mbit/s system bit rates to support electrical cable reception of SDH, PDH and SONET signals.

According to an embodiment of the invention, the LOS detection circuit comprises:

comparator means adapted to compare voltage levels of the incoming electrical signal to an upper threshold voltage and to provide a first comparator signal indicating whether the incoming voltage levels are larger or smaller than the upper threshold voltage, and adapted to compare the voltage levels of the incoming electrical signal to a lower threshold voltage and to provide a second comparator signal indicating whether the input voltage levels are larger or smaller than the lower threshold voltage, detector means adapted to receive and process the first comparator signal and the second comparator signal and to generate a detector output signal having a first logic level when the incoming signal level is larger than the upper threshold voltage or smaller than the lower predetermined threshold voltage and having second logic level when the input signal level is between the upper and the lower threshold voltages, a controller adapted to receive the recovered clock signal or the recovered data bit signal from the CDR circuit to determine data bit periods of the incoming digital data stream, and adapted to, within each data bit period, detect the presence or absence of the first logic level in the detector output signal, and adapted to control the state of the LOS defect signal indicating absence or presence of the digital data stream based on detected first logic levels and predetermined criteria.

The comparator means may comprise a first comparator having one input terminal coupled to the incoming electrical signal and another input terminal connected to an upper threshold-voltage to compare the level of the incoming electrical signal to the upper threshold value and generate a logic low or a logic high output signal depending on the level of the input signal. The comparator means may further comprise a second comparator also having two input terminals, one being connected to the incoming electrical signal and the other connected to a lower threshold voltage. By providing the respective comparator output signals to respective input terminal of an OR gate and using the OR gate output signal as a detector circuit output, a detector output signal can be provided wherein incoming signal levels outside one or the other threshold voltage are represented by a first logic level and input signal levels between the threshold values are represented by a second logic level.

For incoming data streams that are DC-coupled into the input terminal of the compartor(s), a single threshold voltage relative to a ground potential of the integrated circuit may be utilised so that the level of the incoming electrical signal is compared to this threshold voltage.

Each comparator may also be provided with a threshold voltage by deliberately introducing into the comparator a predetermined off-set voltage, where the comparator's input referred off-set voltage is set to a value equalling the required upper or lower threshold voltage. By applying the input signal as a differential signal between a pair of differential input terminal of the comparator rather than between one input terminal and ground, well-known advantages, such as improved noise rejection, of balanced signal processing may be obtained. Furthermore, a number of internal integrated components and/or external circuit components which are usually required in order to generate accurate threshold voltages may be omitted, thereby saving die area and lowering the fabrication and testing cost of each integrated circuit.

By providing the recovered clock signal or the data bit signal to the controller from the data and clock recovery circuit, the controller may be adapted to monitor the detector output signal in each data bit period of the data stream to detect a presence of the first logic level in each data bit period. In a situation where solely a recovered data bit signal is provided to the controller and the recovered clock signal is absent, the controller may still determine the presence of the first logic level within each data bit period if the coding of the received data stream is known. The controller may, in this situation, comprise an edge-triggered counter having an input terminal connected to the detector output signal and adapted to receive a reset signal at the end of each data bit period, thereby counting pulses to the first logic level in each data bit period. Since the coding of the data bits is known and the data bits are also known from the data bit signal, the controller may determine the number of pulses in the detector output signal that a given sample of received data bits should contain. The controller may subsequently compare a determined number of received data bits in the sample to the counted number of pulses in the same sample and calculate how many data bits in the sample that where larger than the upper threshold voltage or lower than the lower threshold voltage (if two threshold voltages are utilised).

Due to the typical triangular waveform shape and low signal level of data bits that have been transmitted over an electrical cable, a comparator output signal will often comprise pulses having a pulse width which is substantially proportional to the level of the incoming electrical signal (for signals larger than the upper threshold value or smaller than the lower threshold value). Consequently, triangularly-shaped incoming electrical signals with a level rising only slightly above the upper or falling slightly below the lower threshold voltage will generate very short duration pulses (compared to the bit period) in the detector output signal while signal levels well above or below the respective threshold voltages will generate pulses of longer duration. The first logic level may accordingly only be present in the detector output signal in very short time intervals. This property of the detector pulse duration is illustrated in FIG. 2 by the triangularly-shaped incoming electrical signal, RDAT and the detector circuit output signal, DECT1, generated in response to signals CP1 and CP2. To detect the presence of the first logic level in the detector output signal, the controller should accordingly be capable of reliably detecting both very short pulses and longer pulses (compared to the data bit period) in the detector circuit output signal. This detection may be accomplished according to different schemes, e.g. the detector output signal may be oversampled with a sampling rate which is sufficiently high to detect short duration pulses or by a circuit adapted to detect and hold an occurrence of the first logic level in a data bit period for the rest of that data bit period. An oversampling scheme could be implemented by providing the detector output signal to a number of D-FF input terminals and clock the D-FFs with successively delayed clock signals so as to sample the detector output signal at a number of discrete points in time during each data bit period of the received data stream.

According to this embodiment of the invention, the controller is further adapted to control the state of the LOS defect signal indicating absence or presence of the digital data bit stream based on detected first logic levels and predetermined criteria. The predetermined criteria may comprise counting a number of data bit periods of the data stream and determining a valid bit count representing a number of detections of the first logic level in the counted number of data bit periods and determining, based on predetermined rules stored in the controller and the valid bit count, the state of the LOS defect signal. By adapting the controller to count a number of data bit periods larger than one, such as between 2 and 1048576, or more preferably between 4 and 2048, or even more preferred between 10 and 255, and determining the valid bit count, a digital averaging procedure can be performed to smooth out short duration LOS events generated by e.g. random noise bursts. By utilising a such averaging procedure, only longer duration LOS events sustaining for at least between 10 and 255 data bit periods or longer may be considered as true LOS events and activate the LOS defect signal, while shorter LOS events due to random disturbances are ignored, since they may be considered to not constitute a true LOS event.

According to one embodiment of the invention, the controller comprises at least one Set-Reset Latch (SR-Latch) having a Set input terminal adapted to receive the detector output signal and having a Reset terminal adapted to receive a SR clock signal operating synchronous with respect to the recovered clock signal to reset the at least one SR-Latch at the beginning of each new data bit period. By providing a SR clock generator circuit that comprises a one-shot circuit that is adapted to generate a short reset pulse to the at least one SR-Latch in phase with the recovered clock signal at the beginning of each new data bit period the at least one SR-Latch is adapted to detected the presence of the first logic level in each data bit period. In this context the term "short reset pulse" designates a pulse with short duration compared to the duration of a data bit, such as a reset pulse of a duration shorter than 0.5–1 nanoseconds for a data bit duration in 140–155 Mbit/s data stream.

By coupling the Set terminal of the at the at least one SR-Latch to the detector output signal, even very short duration pulses (compared to the bit period) representing the presence of the first logic level within a data bit period in the detector output signal can conveniently be detected and held at an output terminal of the at least one SR-Latch of the end of the data bit period. At the end of the data bit period, the logic level of the one SR-Latch output terminal may be sampled by the controller to determine the presence or absence of the first logic level in that data bit period. After the controller has sampled the value of the SR-Latch output signal, the SR-Latch can be reset by a SR clock signal operating synchronously with respect to the recovered clock signal to shortly reset the at least one SR-Latch at the beginning of each new data bit period and make the at least one SR-Latch ready to detect the presence of the first logic level in the following data bit period.

According to a preferred embodiment of the invention, the controller comprises a first SR-Latch adapted to receive the detector output signal on its Set input terminal and a second SR-Latch adapted to receive the detector output signal at its Set input terminal.

The controller is further adapted to receive oppositely phased first and second SR clock signals, both SR clock signal having the frequency of or half of the frequency of the recovered clock signal and being substantially in phase thereto, and wherein a Reset terminal on the first SR-Latch is adapted to receive the first SR clock signal and a Reset terminal on the second SR-Latch is adapted to receive the second SR clock signal, thereby alternatingly operating each of the first and second SR-Latch in Set and Reset mode, one after the other, to detect the presence of the first logic level in the detector output signal within each data bit period of the incoming digital data bit stream. The result of alternatingly operating each of the SR-Latches in Set and Reset mode with SR clock signals having half the frequency of the recovered clock signal is illustrated by waveforms DECT1, SRI and SR2 on FIG. 2 showing that for each data bit period, one of the SR-Latches is operated in Set mode while the other SR-Latch is operated in Reset mode and for the subsequent data bit period, the operation modes are reversed. The required phase reversal of the second SR clock signal before applying it to the second SR-Latch Reset terminal may conveniently be obtained in embodiments of the invention that use differential logic gates by simply interchanging the connection leads to the Reset terminals. Furthermore, the use of differential logic gates will naturally also provide two Set and output terminals of each of the SR-Latches and two output terminals for the detector output signal. For data streams that are encoded according to schemes where each data bit has two signal transitions, such as CMI encoded data streams, both the SR clock signals of the SR-Latches may be provided with a frequency identical to the frequency of the recovered clock signal since one SR-Latch will be in Set mode for one half of the data bit period and while the other SR-Latch will be in Set mode for the remaining part of that data bit period in this situation. Accordingly, within each data bit period any occurrence of the first logic level will be detected in a manner corresponding to the manner wherein both the SR clock signals had half the frequency of the recovered clock signal. When half frequency SR clock signals are utilised, received data bits can be detected by the present parallel SR-Latch coupling independent of the encoding scheme of the received data stream.

According to a preferred embodiment of the invention, the controller is adapted to count data bit periods in consecutive blocks of N data bits, and to determine for substantially each of the blocks of N bits, the valid bit count which equals the number of data bit periods wherein the presence of the first logic level has been detected. N may be any integer number, but is preferably a number between 4 and 2048 or more preferably between 10 and 255, such as about 16. The controller may further be adapted to control the state of the LOS defect signal according to predetermined criteria and the valid bit count within a N-bit block of data bits. The predetermined criteria of the controller may comprise that if the valid bit count within one block of N data bits is zero, the LOS defect signal is activated, thereby providing a LOS defect signal that may be compatible with the ITU-T G. 775 specification of LOS defect signals. However, other application specific criteria may also be utilised in accordance with that application's requirements so that the LOS defect signal may be activated in response to any valid bit count between 1 and N−1 or even in response to criteria based on valid bit count in several consecutive N-bit blocks.

The controller may further be adapted to clear an active LOS defect signal according to a predetermined clear criteria of the controller and a valid bit count. Preferably, the predetermined clear criteria comprise clearing the LOS defect signal, if the valid bit count equals N within one block of N data bits. By using the same value, N, to define the size of the consecutive blocks of data bits in the predetermined criteria relating to activation as well as clearance of the LOS defect signal, a single modulo N counter can be utilised to implement the data bit counting functionality, thereby minimising the required gate count to implement this function. Alternatively, the predetermined clear criteria of the controller may comprise processing the data bits in consecutive blocks of M bits for controlling the clearance of the LOS defect signal, where M is an integer number different from N. In this situation, subsequent to the LOS defect signal has been activated by the controller due to a detected LOS event within e.g. a 16 bit block of data bits, the controller may require that the valid bit count equals e.g. 128 within one block of 128 data bits (M=128) before the LOS defect signal is cleared to indicate the presence of the incoming electrical signal. M is preferably selected as an integer number between 2 and 1048576. Accordingly, N and M may be chosen independently of each other, and if desired, be selected so as to provide some time domain or axis hysteresis into the control of the LOS defect signal. This hysteresis may be selected in accordance with a communication systems designer's experience of particular statistical characteristics of LOS events in the communication channel in question.

The controller may comprise an OR gate having a first input terminal coupled to the first SR-Latch output terminal and a second input terminal coupled to the second SR-Latch output terminal,
  a Data Flip-Flop (D-FF) having an Data input terminal coupled to an output terminal of the OR gate and having a Clock input terminal coupled to the recovered clock signal,
  thereby generating a D-FF output signal synchronously to the recovered clock signal, wherein a presence of the first logic level within a data bit period is represented by a first D-FF logic level and wherein a detected absence of the first logic level within a data bit period is represented by a second D-FF logic level.

According to a preferred embodiment of the invention, the comparator means comprise a first comparator with a differential amplifier input stage with a pair of differential input terminals and having a first predetermined off-set voltage and a second comparator with a differential amplifier input stage with a pair of differential input terminals and having a second predetermined off-set voltage, each differential amplifier comprising a pair of differential output terminals, each of output terminals being coupled to a supply voltage through a respective load resistor. These differential amplifier input stages or input stages are preferably based on bipolar transistors to obtain a fast response time and a low inherent off-set voltage for the comparators. Each of the first and second comparator may further comprise a buffer circuit connected to the differential output terminals of the input stages to remove or minimise DC-loading of these output terminals from a bipolar logic gate or other processing circuitry connected thereto from the detector means in order to detect the first and second comparator output signals.

Various design methods may be applied to generate the first and second predetermined off-set voltages. The pair of load resistors associated with each input stage may be provided with a resistance ratio different from one to generate the comparator off-set voltage. Clearly, practical resistor pairs will always have a resistance ratio slightly different from one, but a resistor pair can usually be matched within 0.5 %–0.1 % by careful layout techniques. However, in the present context a well-defined resistor ratio of e.g. 0.9 or 0.5 between the pair of load resistors may be provided to deliberately introduce the required off-set voltage into a comparator. By using a load resistor pair wherein the resistors of the pair are of different value, an unwanted difference in RC time constant between the output terminals of each of the input stages is, however, introduced due to the difference in resistor values and the difference in associated output node capacitance introduced by the difference in load resistor geometry.

Preferably, the first and second predetermined off-set voltages are selected to be of equal numerical value but of opposite sign, and the pair of differential input terminals of the first comparator and of the second comparator are adapted to receive the incoming electrical signal as a differential signal. Thereby comparing the voltage levels of the incoming electrical signal to the respective predetermined threshold voltages constituted by the respective predetermined off-set voltages. By generating the off-set voltages to be of equal magnitude and opposite sign and applying the incoming electrical signal as a differential signal to both comparators, the lower and upper threshold voltages are positioned symmetrical about a zero DC value of the incoming electrical signal, the upper and lower threshold values are preferably set to about 75 mVolt and −75 mVolt, respectively.

Predetermined off-set voltages which are of equal numerical value but of opposite sign may be obtained for the first and second comparators by a first off-set current source drawing an off-set current from an inverting output terminal of the first or the second input stage and a second off-set current source drawing an equal off-set current from a non-inverting output terminal of the other input stage in embodiments that utilise identical load resistor pairs in both input stages. A such design method allows the predetermined off-set voltages to be very well matched between the first and second comparators due to excellent matching properties that may be provided between bipolar current sources in integrated circuit technology. The first and second off-set currents are preferably derived from a current generator circuit which is based on a resistor of the same type as the load resistors of the input stages and therefore tracking process and/or temperature introduced variations in the value of the load resistors. This a current generator circuit may additionally operate as a current reference for the constant current sources biasing the first and the second differential amplifier input stages, so that the off-set current sources are adapted to track the bias currents sources of the differential amplifier input stages over temperature and global process variations to provide a very accurate absolute value of the off-set voltages in the comparators and additionally provide a very accurate matching of off-set voltages between the first and second comparator.

A second aspect of the invention relates to a Loss Of Signal (LOS) detection circuit for receiving an incoming electrical signal of a digital data bit stream, and comprising:
  comparator means adapted to compare voltage levels of the incoming electrical signal to an upper threshold voltage and to provide a first comparator signal indicating whether the incoming voltage levels are larger or smaller than the upper threshold voltage, and
  adapted to compare the voltage levels of the incoming electrical signal to a lower threshold voltage and to provide a second comparator signal indicating whether the input voltage levels are larger or smaller than the lower threshold voltage, detector means adapted to receive and process the first comparator signal and the second comparator signal and to generate a detector output signal having a first logic level when the voltage level is larger than the upper threshold voltage or smaller than the lower threshold voltage and having second logic level when the voltage level is between the upper and the lower threshold voltages, a controller adapted to receive the recovered clock signal from the CDR circuit to determine data bit periods of the digital data bit stream, and adapted to, within each data bit period, detect the presence or absence of the first logic level in the detector output signal, and adapted to control the state of a LOS defect signal indicating absence or presence of the digital data bit stream based on detected first logic levels and predetermined criteria.

The LOS detection circuit according to the present aspect of the invention may be integrated on an ASIC together with other application specific or general purpose signal processing circuit blocks or modules or, alternatively, provided as a stand alone ASIC. Alternatively, the LOS detection circuit may be provided a board level (Printed Circuit Board) circuit comprising commercially available circuit devices such as Operational amplifiers, comparators, logic gates, transistors, micro-controllers etc. The LOS defect signal may be provided on an external accessible terminal of an ASIC package or a terminal of a Printed Circuit Board, or the LOS defect signal may, in particular for highly integrated ASIC solutions be provided internally to an embedded communication systems controller or microprocessor.

The LOS detection circuit may also be provided with programmable parameters such as programmable upper and lower threshold voltages, a programmable value of N and/or M if block processing of the data bits of the data stream is utilised by the controller. The user programming may be provided as pin programming where parameter programming is accomplished by setting predetermined pins of an integrated circuit package to a predetermined voltage level or left open. Alternatively, the LOS detection circuit according to the invention may be provided with a built-in communication interface such as an industry standard IIC or IIS serial interface or any other proprietary or standard programming interface, and the programmable parameters could be controlled by programming the parameters from a host computer.

A third aspect of the invention relates to a method of determining a Loss of Signal (LOS) of an incoming electrical signal of a digital data bit stream, the method comprising the steps of:

recovering a clock signal or a data bit signal of the digital data bit stream encoded or embedded in the digital data bit stream, comparing a voltage level of the incoming electrical signal to an upper threshold voltage, providing a first comparator signal indicating whether the voltage level is larger or smaller than the upper threshold voltage, comparing the input voltage level of the incoming electrical signal to a second threshold voltage, providing a second comparator signal indicating whether the voltage level is larger or smaller than the lower threshold voltage, processing the first comparator signal and the second comparator signal to generate an detector output signal having a first logic level when the input signal level is larger than the upper threshold voltage or smaller than the lower threshold voltage, and to generate a second logic level when the input signal level is between upper and the lower threshold voltages, determining data bit periods of the incoming digital data signal by a controller receiving the recovered clock signal or data bit signal, detecting, within each data bit period, the presence or absence of the first logic level in the detector output signal, and controlling a state of a LOS defect signal indicating absence or presence of the digital data stream based on detected first logic levels and predetermined criteria.

The method may furthermore comprise the step of counting the data bit periods in consecutive blocks of N data bits, and determining for substantially each of the blocks of N bits, a valid bit count equalling the number of data bit periods wherein the presence of the of the first logic level has been detected, controlling the state of the LOS defect signal according to predetermined criteria of the controller and the valid bit count, N being an integer number such as a number between 2 and 1048576, more preferably between 10 and 255.

The method may also comprise the further steps of activating the LOS defect signal if the valid bit count within one block of N data bits is zero and clearing and an activated LOS defect signal, if the valid bit count within one block of N data bits is N. Alternatively, the method may comprise clearing the activated LOS defect in response to predetermined criteria based and the valid bit count in consecutive blocks of M bits, where M is an integer number different from N.

BRIEF DESCRIPTION OF THE DRAWINGS

A preferred embodiment of an integrated receiver circuit according to the invention is described in the following with reference to the drawings, wherein.

DETAILED DESCRIPTION OF A PREFERRED EMBODIMENT

In the following, a specific embodiment of an integrated circuit according to the invention is described and discussed in greater detail. The present description details relevant circuit blocks including a cable equaliser, a CDR circuit and LOS detection circuit assembled on a single ASIC to implement a 140–155 Mbit/s CMI receiver or interface.

All signal lines and input/output terminals of circuit blocks are illustrated as single ended signals to simplify the drawings. However, the present embodiment of the integrated circuit utilises a fully differential signal processing and, accordingly, fully differential circuit blocks, such as logic gates, amplifiers, comparators etc. The fully differential signal processing has the effect that each terminal on the circuit blocks and each interconnecting line between the circuit blocks of the present drawings in the present embodiment of the invention represent two terminals or two signal lines, respectively, providing oppositely phased versions of the same signal. The fully differential signal processing has several advantages, relating to improving noise rejection and minimising internal coupling between the equaliser circuit block, the CDR circuit and the LOS detection circuit block through the common substrate of the integrated circuit and/or trough shared power supply and ground networks.

The operation of the circuit blocks of FIG. 1 in order to provide the required level detection of the incoming digital data stream will be explained below with reference to the signal waveforms shown on FIG. 2.

To support the required high-speed operation of the present integrated circuit, logic gates are preferably implemented as CML logic using bipolar transistors. The preferred process is a 1.2 μm BiCMOS process suitable for mixed signal circuits operating within the frequency range of about 0 Hz to 1.25 GHz. The bipolar transistors provided by this process have $f_T$ values of about 12 GHz. For integrated circuits that are required to operate at higher frequencies than the present integrated circuit, other commercially available or proprietary BiCMOS or bipolar processes could be utilised that may provide bipolar transistors with $f_T$ values of about 25 GHZ.

Figure 2:
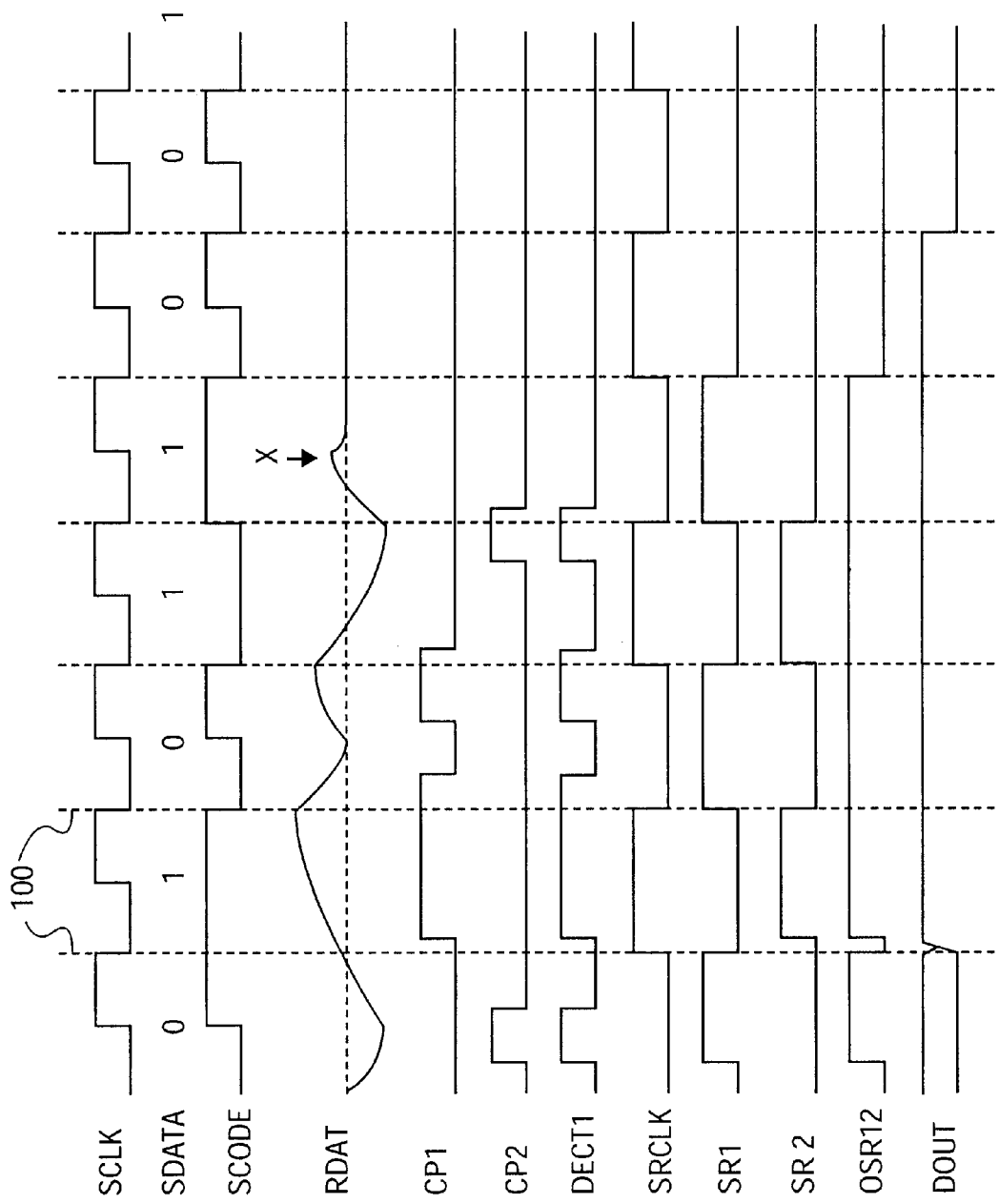
FIG. 2 is a timing diagram illustrating signal waveforms on input and output terminals of key circuit blocks on the block diagram of FIG. 1 before and after a loss of signal event (LOS event) of an incoming digital data bit stream.

FIG. 2 illustrates a number of signal waveforms, wherein SCLK is a 50/50 duty cycle transmitter clock signal, SDATA is the digital data bit stream to be transmitted represented as 0/1 binary data stream, and SCODE represents SDATA in a CMI encoded format.

Figure 3:
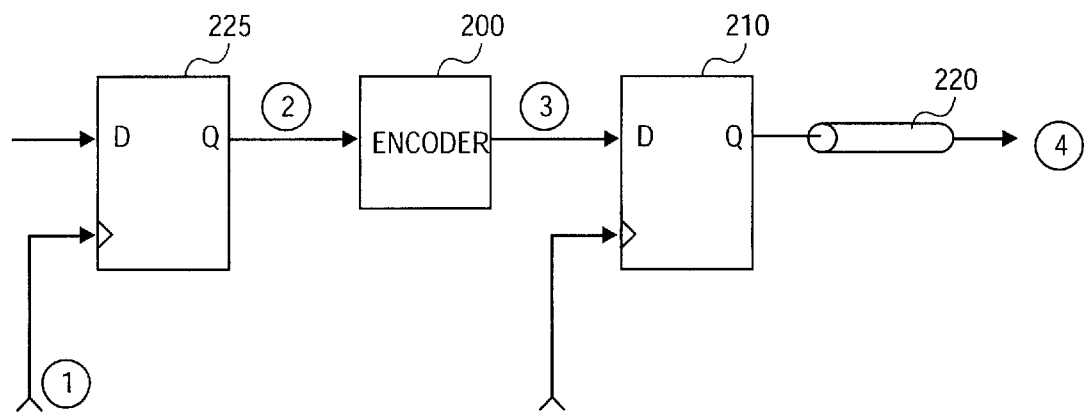
FIG. 3 is a block diagram illustrating a transmitter part of a communication system responsible for generating and transmitting the digital data bit stream to the receiver integrated circuit.

FIG. 3 illustrates a transmitter circuit which performs the generation of signal SCODE by a CMI encoder circuit 200 that receives the digital data bit stream to be transmitted, SDATA, on line 2 and provides the encoded digital data bit stream, SCODE, on line 3. The SCODE signal is clocked out to an electrical cable communication channel 220 controlling a D Flip-Flop (D-FF) 210 controlled by a output clock signal on line 1 which is applied a Clk input terminal on the D-FF 210. The frequency of this output clock signal is the double of the frequency of the SCLK signal due to the CMI encoding of the transmitted data, SDATA.

RDAT illustrates a typically incoming electrical signal waveform of the transmitted SCODE data bit stream after the data bit stream has been transmitted over the electrical cable communication channel (220 on FIG. 3). The illustrated RDAT signal waveform is representative for the distortions introduced into the transmitted data bit stream, represented by SCODE, by frequency dependent losses in the electrical cable. The dotted line 110 illustrates a DC zero level of the signal waveform.

Figure 1:
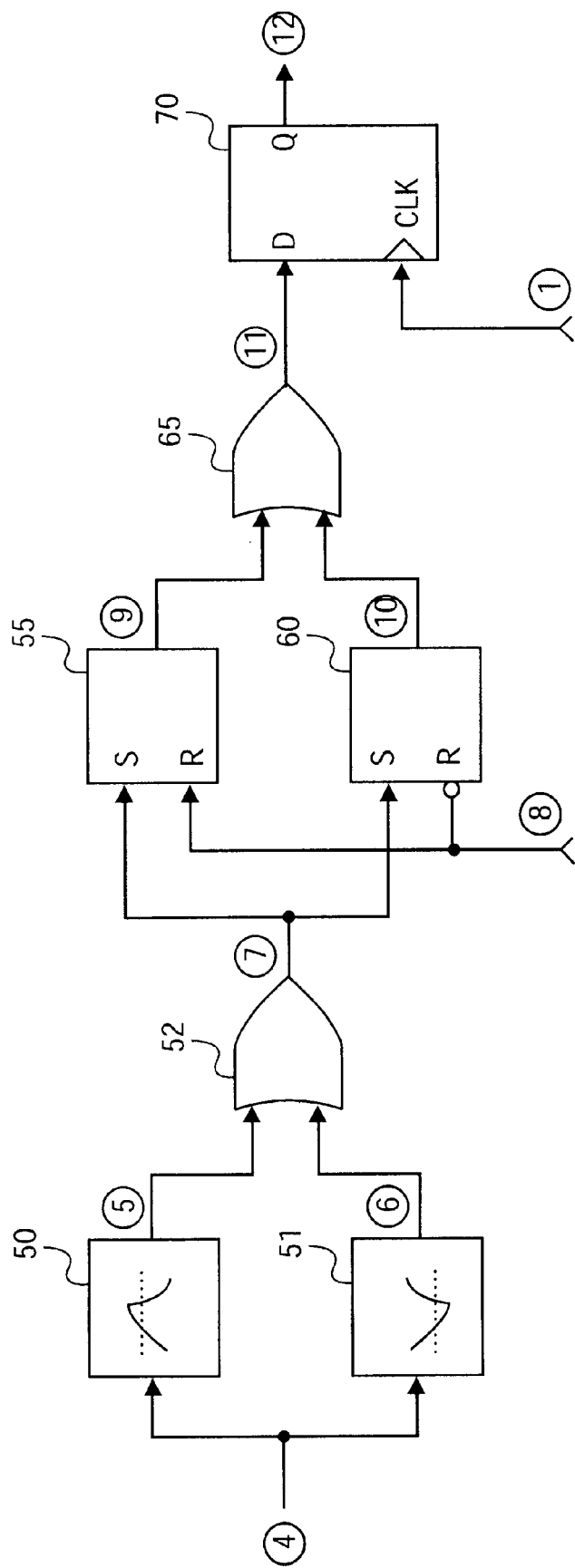
FIG. 1 is a block diagram illustrating a comparator circuit, a detector circuit and a part of a controller jointly implementing an incoming signal level detecting function of an integrated circuit according to the invention.

The RDAT electrical signal is transmitted on input line 4 of FIG. 1 to a first comparator 50 which compares the level of the incoming signal to an upper threshold voltage and generates an output signal 5 indicating the result of the comparison. The output signal on line 5 is a logic signal having two distinct logic states a logic "low" or 0 state if the input signal voltage is smaller than or substantially equal to the upper threshold voltage and a logic "high" or 1 state if the input signal voltage is larger than the upper threshold voltage. The first comparator 50 is preferably provided with a pair of differential input terminals to allow a differential data stream signal to be applied to the input terminals. A second comparator 51 compares the level of the input signal to a lower threshold voltage. This second comparator 51 is preferably identical to the first comparator 50 and has the same numerical threshold voltage but of opposite sign so that by applying the input signal to the differential input terminals of this omparator a lower threshold voltage is provided. Alternatively, the lower threshold voltage can be provided by applying a phase reversed version of the differential input signal to a version of this comparator which is identical to the first comparator 50. Preferably, the upper and lower threshold voltages are set at about 75 mVolt and −75 mVolt, respectively, which translates to about −23 dB relative to a nominal signal level voltage of 1 V peak. However, according to the ITU-T G. 703 specification for 140–155 Mbit/s systems, a relatively wide range of threshold voltages can be utilised corresponding to levels from −18 dB to −35 dB below nominal signal level.

Figure 5:
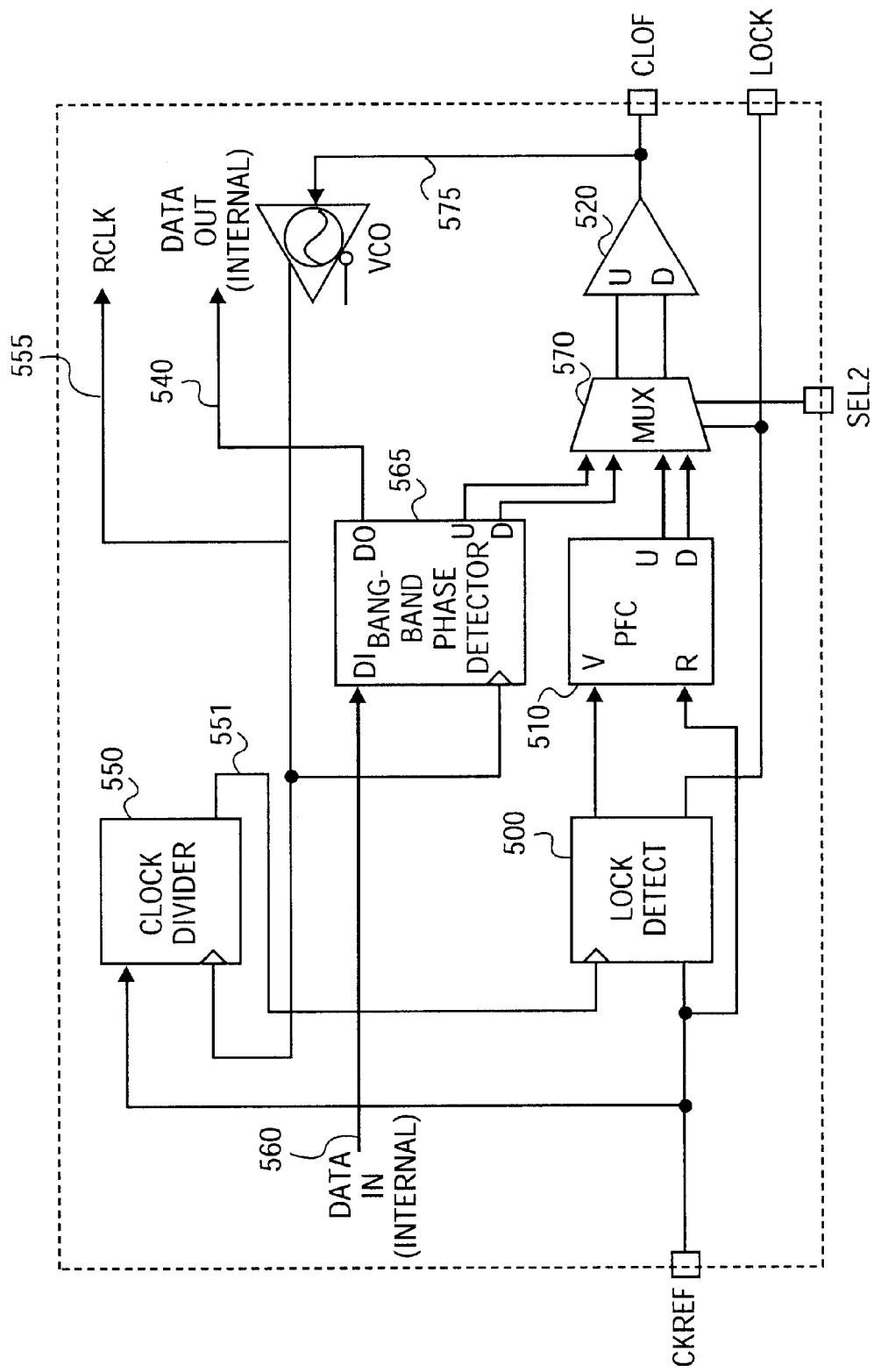
FIG. 5 is a detailed block diagram of the CDR circuit according to the invention.

First and second comparator output signals, 5 and 6, are transferred to input terminals of an OR gate 52 and the output signal from the OR gate 52 is transferred to two parallelly coupled SR-Latches 55, 60. The output signals of the first and second comparators 50, 51, respectively, are illustrated as signals CP1 and CP2, respectively on FIG. 2. Signal CP1 illustrates that each time the comparator input signal RDAT crosses the upper threshold voltage of the first comparator 50, a low to high transition or high to low transition is generated at the output of the first comparator 50. Signal CP2 is generated by the second comparator 51 operating according to a corresponding scheme, except for the lower threshold voltage. A signal DECT1 illustrates an output signal of an OR gate 52. Due to the OR operation of OR gate 52, the DECT1 signal is generated so that a high logic level in this signal represents incoming signal levels that are larger than the upper threshold voltage or smaller the lower threshold voltage while a low logic state represent incoming signals between the threshold voltages. Accordingly, if a LOS event occurs in the communication channel transmitting the digital data bit stream, as illustrated with symbol "X" on signal RDAT on FIG. 2, the incoming electrical signal voltage drops to zero and no longer crosses the upper threshold voltage or the lower threshold voltage which causes the OR gate output signal on line 11 to enter a constantly low logic state, as illustrated on FIG. 2 of the DECT1 signal. A controller front end comprising the SR-Latches 55, 60, the OR gate 65 and a Data Flip-Flop (D-FF) 70 is adapted to receive a recovered clock signal on line 1 provided by the CDR circuit of FIG. 5 on line 540, to determine data bit periods of the received digital data bit stream. The rest of the controller is not illustrated but may be designed by the skilled person according to well know principles for designing such finite state machines. The data bit periods of the transmitted data stream are marked on FIG. 2 by vertical broken lines 100. Strictly speaking may the recovered data bits periods and the recovered clock signal of the recovered data stream be slightly out of phase to the transmitted data bits periods and clock signal, respectively, due to a finite precision in the lock operation of a Phase Locked Loop (PLL) function as provided in the CDR circuit (FIG. 5). The presence of such a minor phase difference(s)

between data bit periods and clock signals of the transmitted data stream and the recovered data stream is ignored since this a well-known phenomenon related to the use of PLLs in clock and data recovering circuits. Trying to illustrate these minor phase difference(s) would only add non-essential (in terms of understanding the principles of the present invention) and unnecessary complications to the waveforms of FIG. 2.

Each of the two parallelly coupled SR-Latches 55, 60 has its Set terminal connected to the OR gate 52 output signal line 7 constituting a detector output signal in the present embodiment of the invention. Each Reset input terminal of the SR-Latches 55, 60 is connected to a SRCLK signal on line 8. This SRCLK signal is synchronous to and in phase with the recovered clock signal provided on line 1, but of half the frequency, as illustrated by the waveform SRCLK of FIG. 2. For the present embodiment of the invention which is adapted to receive and recover a CMI encoded data stream, the SRCLK signal may alternatively have the same frequency as the frequency of the recovered clock signal.

Figure 4:
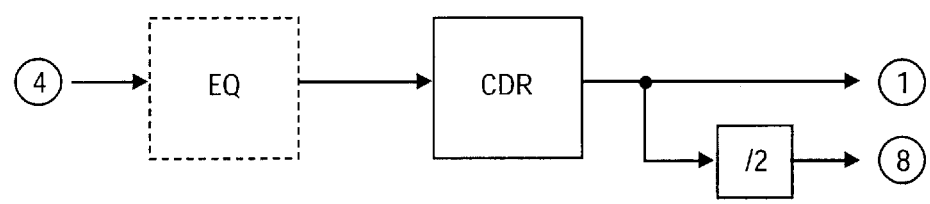
FIG. 4 is a block diagram of a Clock and Data Recovery circuit (CDR) and a clock frequency halving circuit according to the invention.

The SRCLK signal is generated within the CDR circuit, as illustrated on FIG. 4 and FIG. 5. One SR-Latches 60 receives a phase inverted SRCLK signal as illustrated by the dot on the Reset terminal of this SR-Latch. Since the SR-Latch 60 is fully differential as mentioned above, the required clock signal inversion is conveniently obtained by crossing the differential clock signal lines 8 before attaching them to the Reset input terminal(s). For single ended signal processing, simply inserting an inverter in front of the Reset terminal will provide the required clock inversion, however, a small delay path difference can be introduced between the Reset input signals of the SR-Latches 55, 60. Due to the phase reversed SRCLK signals, each of the SR-Latches 55, 60 is alternatingly operated in Set and Reset mode, one after the other, so that one SR-Latch is operated in reset mode in one clock period of the recovered clock signal while the other SR-Latch is operated in Set mode in that clock period. During the subsequent clock period, the operation of the SR-Latches is reversed. By combining the output signals 9, 10 of SR-Latches 55, 60, respectively, into the respective input terminals of an OR gate 65, an OR gate output signal, ORSR12, is obtained on line 11 wherein any occurrence of a high logic level in the detector output signal, DECT1, on line 7 within a data bit period is detected and held to the end of that data bit period either by SR-Latch 55 or SR-Latch 60, depending on which SR-Latch is operating in Set mode. At the beginning of the subsequent data bit period, the SR-Latch that was previously in Set mode is operated in Reset mode while the other SR-Latch which was previously in Reset mode is operated in Set mode and ready to detect another occurrence of a high logic level in the detector output signal, DECT1, on line 7.

The edge sensitive D-FF 70 receives an ORSR12 output signal, as illustrated by the respective waveforms of FIG. 2, on the Data input terminal and is clocked with the recovered clock signal on line 1. Accordingly, at the end of each data bit period the logic state of the ORSR12 signal on line 11 is sampled and held for the next data bit period on the Q output terminal of the D-FF 70 on line 12. This Q output signal is illustrated as signal waveform DOUT on FIG. 2. The DOUT signal is synchronous to the recovered clock signal and the logic level indicates whether an occurrence of a high logic level in the detector output signal, DECT1, within a data bit period was detected and, consequently, whether the incoming electrical signal level in that data period was larger than the upper threshold voltage or lower than the lower threshold value at any instant in time. A controller (not shown) also operating synchronous to the recovered clock signal is preferably connected to the DOUT signal and adapted to, within each data bit period, detect the logic level of DOUT. This controller is preferably also adapted to control the state of an externally accessible LOS defect signal indicating absence or presence of the digital data stream to external equipment. The controller is preferably adapted to count data bit periods in consecutive blocks or samples of 16 data bit periods, and to determine for each block of 16 bits, a valid bit count equalling the number of data bit periods wherein the presence of the first logic level has been detected. This may conveniently be achieved in the present embodiment of the invention by detecting the logic state of the DOUT signal in each data bit period and count e.g. the number of detected high logic levels in a block, if a high logic of DOUT indicates a detection of the first logic level.

The controller is preferably adapted to control the state of the LOS defect signal so as to comply with the LOS specifications of the ITU-T G. 775 standard for 140–155 Mbit/s system bit rates. This has been accomplished by adapting the controller to activate the LOS defect signal in response to a valid bit count of zero within one block of 16 data bits and by further clearing an already active LOS defect signal in response to a valid bit count of 16 within one block of 16 data bits. Clearly, the controller may easily be adapted to control the state of the LOS defect signal according to other criteria. The block size may be selected to any value between 10 and 255 and still comply with the ITU-T G. 775 standard or the block size may be selected to any other practical value outside this interval.

Figure 6:
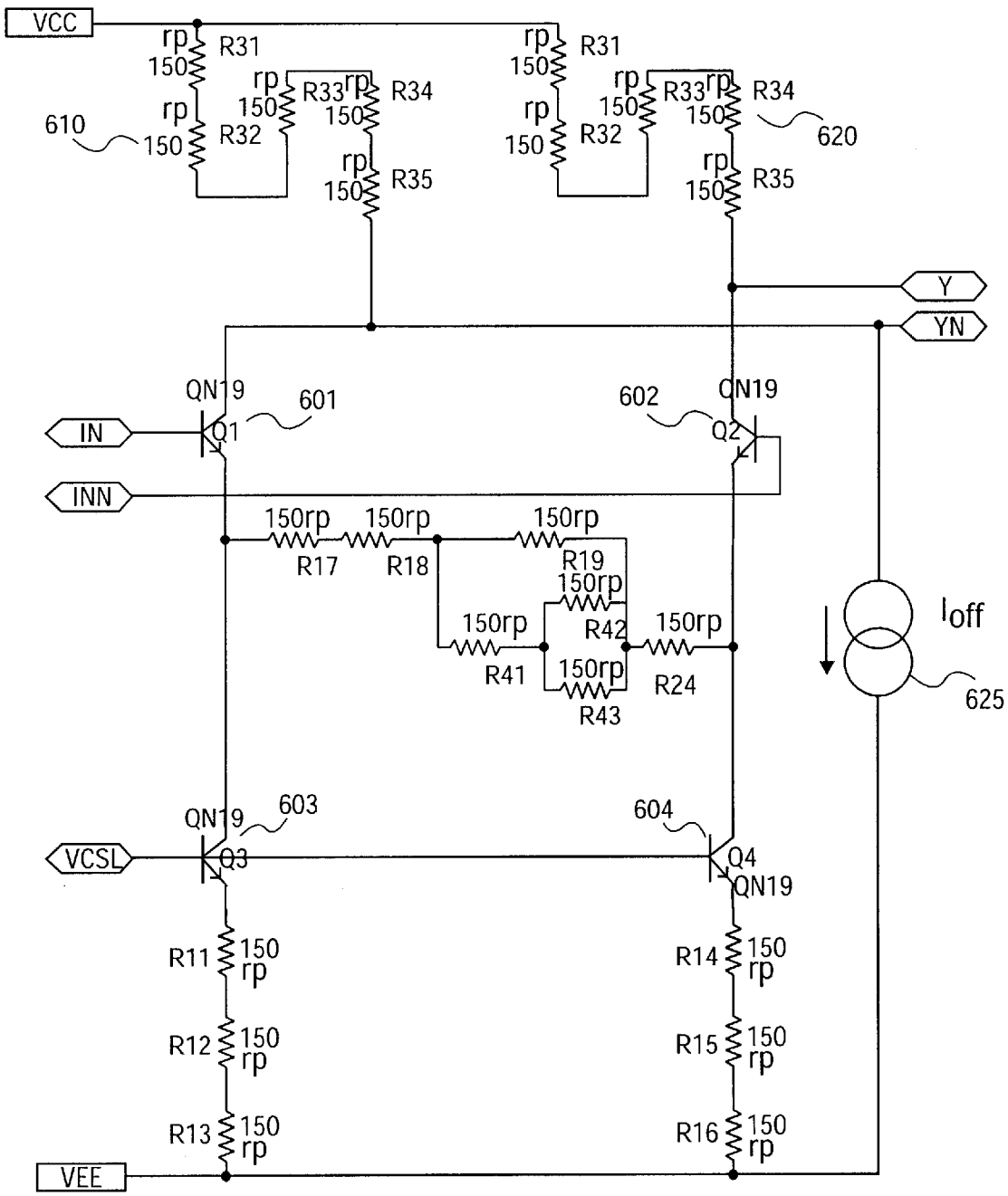
FIG. 6 is a schematic diagram of a differential bipolar input stage of a comparator with a build-in off-set voltage for comparing incoming signal levels with an upper and a lower threshold voltage.

FIG. 6 shows a schematic diagram of a first bipolar differential amplifier input stage of a comparator circuit that compare the level of the incoming electrical signal to an upper threshold voltage. The differential incoming electrical signal is applied to correspondingly differential terminals IN and INN of a bipolar transistor pair 601, 602. A pair of load resistors 610, 620 are connected between a respective pair of differential output terminals Y, YN and a power supply voltage VCC. Each load resistor comprises four cascaded resistors, each resistor having a value of about 150 ohm so that the load resistor pair is a pair of substantially equal value resistors. Transistors 603 and 604 provide two constant current sources for biasing the differential input stage. These current source transistors 603, 604 are preferably both controlled from a reference current generator (not shown) also provided on the present integrated circuit so that the currents of the current sources 603, 603 tracks variations in the reference current generator across process and temperature variations. An offset current source 625 is connected to the inverting output terminal YN and draws and off-set current from this terminal and thereby introduces an off-set voltage between the differential output terminals Y, YN. The off-set current source 625 is controlled by the same reference current generator that controls current sources 603, 604 so that the off-set current tracks variations in the current of the current sources 603, 603. Accordingly, an accurate off-set voltage is generated between differential output terminal pair Y, YN. Furthermore, since the gain of the differential input stage is proportional to the bias current provided by current sources 603, 603, a large bias current caused by process variations will generate a high gain in the differential input stage but at the same time generate a correspondingly higher off-set voltage, leaving the input referred off-set voltage substantially constant. Consequently, the present design of the input stage is compensated so that the threshold voltage of the comparator that includes the input stage remains constant across process and temperature variations.

The comparator circuit in the present embodiment of the invention further comprises a second differential input stage which is nearly identical to the above-described first input stage and coupled to the differential incoming electrical signal in parallel with the first input stage. In the second input stage, however, a second off-set current generator draws the off-set current from a non-inverting output terminal rather than the inverting output terminal, thereby creating an output off-set voltage of equal magnitude but of opposite sign to the off-set voltage of the first input stage. Consequently, the comparator circuit provides two comparators, one generating the upper threshold voltage and the other generating the lower threshold voltage so that the threshold voltages are of equal magnitude but opposite sign.

Figure 7:
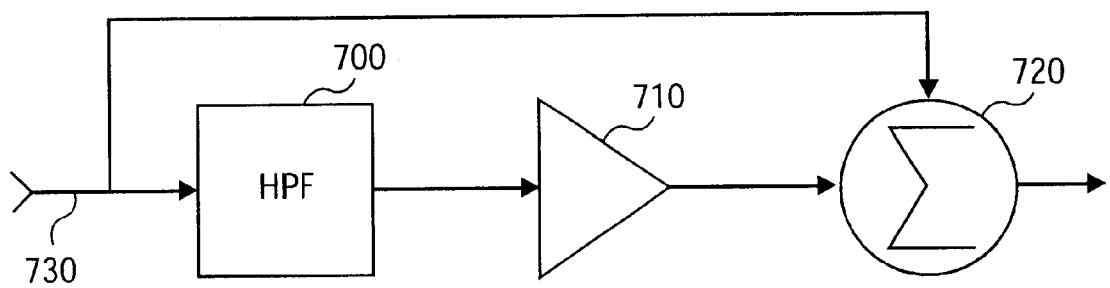
FIG. 7 is a block diagram of an electrical cable equaliser according to the invention.

The detailed block diagram of the CDR circuit shown on FIG. 5 comprises a Data input line 560 that may be connected to the equaliser output signal of FIG. 7 to receive a reshaped digital data bit stream. The data stream is provided to a Bang-Bang phase detector 565 and the output signal of the phase detector 565 is provided to a multiplexer 570 that selects its output signal to be either the phase detector output signal or an output signal of a Phase and Frequency Comparator (PCF) 510. The output signal of the multiplexer 570 is fed to a tristate-able charge pump 520 capable of sinking or sourcing current to an external capacitor connected on terminal CLOF to provide a PLL loop filter that controls a tuning voltage provided to a VCO circuit 530 on line 575 to control a VCO frequency. As the result of the PLL function of the CDR circuit, a recovered data stream is provided on line 540 and a recovered clock signal is provided on line 555, RCLK. A Lock Detect circuit 500 continuously monitors the current frequency of the recovered clock signal via an output signal 551 of a Clock Divider 550 and compares the recovered clock frequency to the frequency of an external reference clock signal provided on terminal CKREF. The Lock Detect circuit is adapted to ensure that the VCO frequency never deviates more than about +/−500 ppm from the reference clock frequency. If a larger deviation is detected, the PLL circuit is considered to be out of lock and the output signal of the PFC is selected by the multiplexer 570, so that the RCLK signal is controlled by the reference clock frequency rather than the frequency of the clock signal embedded in the incoming data stream. The reference clock frequency is preferably provided by an external crystal oscillator. Hence the acquisition time of the CDR circuit in the present embodiment of the invention is short and predictable because the frequency of the VCO circuit 530 is never allowed to drift far away from the expected clock frequency of the incoming data stream during e.g. long duration LOS events of the incoming data stream. During such a LOS event which could be represented on FIG. 2 as starting at time "X" for the signal RDAT, the clock output signal, RCLK of the CDR circuit is controlled by the reference clock frequency rather than the recovered clock signal of the received data stream.

The block diagram on FIG. 7 comprises a one-pole highpass filter 700 an amplifier circuit 710 and a summing circuit 720. The incoming electrical signal is applied on line 730 and provided to the highpass filter 700 and to the summing circuit 720. An optimum gain value for the amplifier circuit 710 and a pole frequency for the highpass filter 700 are preferably determined by an experimental procedure that seeks to minimise a worst case residual jitter content within the received data stream at the equaliser output over a selected range of electrical cable lengths. The data stream is transmitted over various predetermined lengths of the electrical cable within a target range of cable lengths and the worst case residual jitter content is determined as a function of the amplifier's 710 gain value and the pole frequency. The target range of electrical cable lengths is preferably selected so as to comply to the requirements of TU-T G.703.

What is claimed is:

1. An integrated circuit for receiving and recovering an incoming electrical signal of a digital data bit stream transmitted over a communication channel, and comprising
    an equaliser circuit adapted to reshape the electrical signal to be provided to,
    a CDR circuit adapted to receive the reshaped electrical signal and to recover data bit signal of the digital data bit stream and to recover a clock signal encoded or embedded in the digital data stream, and
    a Loss of Signal (LOS) detection circuit adapted to monitor levels of the incoming electrical signal and further adapted to control a state of a LOS defect signal indicating absence or presence of the digital data bit stream, wherein the LOS detection circuit comprises:
        comparator means adapted to compare voltage levels of the incoming electrical signal to an upper threshold voltage and to provide a first comparator signal indicating whether the incoming voltage levels are larger or smaller than the upper threshold voltage, and adapted to compare the voltage levels of the incoming electrical signal to a lower threshold voltage and to provide a second comparator signal indicating whether the input voltage levels are larger or smaller than the lower threshold voltage,
        detector means adapted to receive and process the first comparator signal and the second comparator signal and to generate a detector output signal having a first level when the incoming signal level is larger than the upper threshold voltage or smaller than the lower threshold voltage and having second logic level when the input signal is between the upper and the lower threshold voltages,
    a controller adapted to receive the recovered clock signal or the recovered data bit signal from the CDR circuit to determine data bit periods of the incoming digital data stream, and adapted to, within each data bit period, detect the presence or absence of the first logic level in the detector output signal, and adapted to control the state of the LOS defect signal indicating absence or presence of the digital data stream based on detected first logic levels and predetermined criteria.

2. An integrated circuit according to claim 1, wherein the integrated circuit is adapted to receive the electrical signal from an optical communication channel.

3. An integrated circuit according to claim 1, wherein the integrated circuit is adapted to receive the electrical signal from an electrical cable communication channel.

4. An integrated circuit according to claim 2, wherein the CDR circuit is adapted to recover the data and the clock signal of a Non Return to Zero (NRZ) or a Return to Zero (RZ) encoded digital data stream.

5. An integrated circuit according to claim 3, wherein the CDR circuit is adapted to recover the data and the clock signal of the digital data bit stream encoded according to a method selected from the group consisting of: Coded Mark Inversion (CMI); 8b/10b coding.

6. An integrated circuit according to claim 5, wherein the incoming digital data bit stream is CMI encoded according to the ITU-T G. 703 specification for 140–155 bit/s system bit rates.

7. An integrated circuit according to claim 1, wherein the controller comprises at least one Set-Reset Latch (SR-Latch)

having a Set input terminal adapted to receive the detector output signal and having a Reset terminal adapted to receive a SR clock signal operating synchronous with respect to the recovered clock signal to reset the at least one SR-Latch at the beginning of each new data bit period, thereby adapting the at least one SR-Latch to detect the presence of the first logic level in the detector output signal in each bit period of the incoming digital data bit stream.

8. An integrated circuit according to claim 1, wherein the controller comprises a first SR-Latch adapted to receive the detector output signal on its Set input terminal and a second SR-Latch adapted to receive the detector output signal at its Set input terminal, and the controller is adapted to receive oppositely phased first and second SR clock signals, both SR clock signal having the frequency or half of the frequency of the recovered clock signal and being substantially in phase thereto, and wherein a Reset terminal on the first SR-Latch is adapted to receive the first SR clock signal and a Reset terminal on the second SR-Latch is adapted to receive the second SR clock signal, thereby alternatingly operating each of the first and second SR-Latch in Set and Reset mode one after the other to detect the presence of the first logic level in the detector output signal within each data bit period of the incoming digital data bit stream.

9. An integrated circuit according to claim 1, wherein the controller is adapted to count data bit periods in consecutive blocks of N data bits, and to determine for substantially each of the blocks of N bits, a valid bit count equalling the number of data bit periods wherein the presence of the first logic level has been detected, and further adapted to control the state of the LOS defect signal according to predetermined criteria of the controller and the valid bit count, N being an integer number.

10. An integrated circuit according to claim 9, wherein the predetermined criteria of the controller comprise that if the valid bit count within one block of N data bits is zero, the LOS defect signal is activated.

11. An integrated circuit according to claim 9, wherein N is an integer number between 10 and 255.

12. An integrated circuit according to claim 9, wherein the controller further is adapted to adapted to clear an active LOS defect signal according to a predetermined clear criteria of the controller and a valid bit count within one block of N data bits.

13. An integrated circuit according to claim 12, wherein the predetermined clear criteria comprise clearing the LOS defect signal if the valid bit count equals N within one block of N data bits.

14. An integrated circuit according to claim 8, wherein the controller further comprises:

an OR gate having a first input terminal coupled to the first SR-Latch output terminal and a second input terminal coupled to the second SR-Latch output terminal, a Data Flip-Flop (D-FF) having an Data input terminal coupled to an output terminal of the OR gate and having a Clock input terminal coupled to the recovered clock signal, thereby generating a D-FF output signal synchronously to the recovered clock signal, wherein a presence of the first logic level within a data bit period is represented by a first D-FF logic level and wherein a detected absence of the first logic level within a data bit period is represented by a second D-FF logic level, a modulo N counter coupled to the D-FF output signal and adapted to count the D-FF logic states for each consecutive block of N data bits of the incoming digital data signal and to provide a valid bit count for substantially each N bit time period to the controller.

15. An integrated circuit according to claim 1, wherein the comparator means comprise a first comparator with a differential amplifier input stage with a pair of differential input terminals and having a first predetermined off-set voltage and a second comparator with a differential amplifier input stage with a pair of differential input terminals and having a second predetermined off-set voltage, each differential amplifier comprising a pair of differential output terminals, each of output terminals being coupled to a supply voltage through a respective load resistor.

16. An integrated circuit according to claim 15, wherein the first and second predetermined off-set voltages are of equal numerical value but of opposite sign, and the pair of differential input terminals of the first comparator and of the second comparator are adapted to receive the incoming electrical signal as a differential signal, thereby comparing the voltage levels of the incoming electrical signal to the respective predetermined threshold voltages constituted by the respective predetermined off-set voltages.

17. An integrated circuit according to claim 16, wherein the predetermined off-set voltage of each of the differential amplifiers is generated by a first off-set current source drawing an off-set current from an inverting output terminal of the first or the second differential amplifier input stage and a second off-set current source drawing an equal off-set current from a non-inverting output terminal of the other differential amplifier input stage.

18. An integrated circuit according to claim 17, wherein the load resistors of the first and second differential amplifiers are of substantially equal value and wherein the respective off-set currents are of substantially equal size.

19. A Loss of Signal (LOS) detection circuit for receiving an incoming electrical signal of a digital data bit stream, and comprising:

comparator means adapted to compare voltage levels of the incoming electrical signal to an upper threshold voltage and to provide a first comparator signal indicating whether the incoming voltage levels are larger or smaller than the upper threshold voltage, and adapted to compare the voltage levels of the incoming electrical signal to a lower threshold voltage and to provide a second comparator signal indicating whether the input voltage levels are larger or smaller than the lower threshold voltage, detector means adapted to receive and process the first comparator signal and the second comparator signal and to generate a detector output signal having a first logic level when the incoming signal level is larger than the upper threshold voltage or smaller than the lower predetermined threshold voltage and having second logic level when the input signal level is between the upper and the lower threshold voltages, a controller adapted to receive a recovered clock signal from a CDR circuit to determine data bit periods of the incoming digital data bit stream, and adapted to, within each data bit period, detect the presence or absence of the first logic level in the detector output signal, and adapted to control the state of a LOS defect signal indicating absence or presence of the digital data bit stream based on detected first logic levels and predetermined criteria.

20. A Loss Of Signal detection circuit according to claim 19, wherein the controller comprises a first SR-Latch adapted to receive the detector output signal on its Set input terminal and a second SR-Latch adapted to receive the detector output signal at its Set input terminal, and a clock circuit adapted to provide oppositely phased first and second SR clock signals, each SR clock signal having the frequency of or half of the recovered clock signal and being substantially in phase thereto, and a Reset terminal on the first SR-Latch being adapted to receive the first SR clock signal and a Reset terminal on the second SR-Latch being adapted to receive the second SR clock signal, thereby alternatingly operating each of the first and second SR-Latches in Set and Reset mode one after the other to detect the presence of the first logic level in the detector output signal within each data bit period of the incoming digital data bit stream.

21. A Loss Of Signal (LOS) detection circuit according to claim 20, wherein the controller is adapted to count data bit periods in consecutive blocks of N data bits, and to determine for substantially each of the blocks of N data bits, a valid bit count equalling the number of-data bit periods wherein the presence of the first logic level has been detected, and further adapted to control the state of the LOS defect signal according to predetermined criteria of the controller and the valid bit count, N being an integer number.

22. A Loss Of Signal (LOS) detection circuit according to claim 21, wherein N is an integer number between 10 and 255.

23. A method of determining a Loss of Signal (LOS) of an incoming electrical signal of a digital data bit stream, the method comprising the steps of:

recovering a clock signal or a data bit signal of the digital data bit stream encoded or embedded in the digital data bit stream, comparing a voltage level of the incoming electrical signal to an upper threshold voltage, providing a first comparator signal indicating whether the voltage level is larger or smaller than the upper threshold voltage, comparing the input voltage level of the incoming electrical signal to a second threshold voltage, providing a second comparator signal indicating whether the voltage level is larger or smaller than the lower threshold voltage, processing the first comparator signal and the second comparator signal to generate an detector output signal having a first logic level when the input signal level is larger than the upper threshold voltage or smaller than the lower threshold voltage, and to generate a second logic level when the input signal level is between upper and the lower threshold voltages, determining data bit periods of the incoming digital data signal by a controller receiving the recovered clock signal or data bit signal, detecting, within each data bit period, the presence or absence of the first logic level in the detector output signal, and controlling a state of a LOS defect signal indicating absence or presence of the digital data stream based on detected first logic levels and predetermined criteria.

24. A method according to claim 23, further comprising the step of:

counting the data bit periods in consecutive blocks of N data bits, determining for substantially each of the blocks of N bits, a valid bit count equalling the number of data bit periods wherein the presence of the of the first logic level has been detected, controlling the state of the LOS defect signal according to predetermined criteria of the controller and the valid bit count, N being an integer number.

25. A method according to claim 24, further comprising the step of:

selecting a value of N between 10 and 255.

26. A method according to claim 24, further comprising the step of:

activating the LOS defect signal if the valid bit count within one block of N data bits is zero.

27. A method according to claim 26, further comprising the step of:

clearing and an active LOS defect signal, if the valid bit count within one block of N data bits is N.

28. An intergrated circuit for receiving a signal of a digital data bit stream and determining a Loss of Signal (LOS) detection, comprising:

a threshold circuit for determining whether or not the received signal is between upper and lower voltage thresholds; and a controller for outputting a LOS defect signal based on the determinations made by the detection circuit during a consecutive number of bit periods of a clock signal recovered from said received signal, wherein the threshold circuit generates an output having a first logic level when the received signal is not between the predetermined upper and lower threshold voltages and having a second logic level when the received signal is in between the predetermined upper and lower threshold voltages, wherein the controller comprised at least one Set-Reset Latch (SR-Latch) having a Set input terminal adapted to receive the detector output signal and having a Reset terminal adapted to receive an SR clock signal operating synchronous with respect to the recovered clock signal to reset the at least one SR-Latch at the beginning of each new data bit period, thereby adapting the at least one SR-Latch to detect the presence of the first logic level in the detector output signal in each bit period of the incoming digital data bit stream.

29. An integrated circuit for receiving a signal of a digital data bit stream and determining a Loss of Signal (LOS) detection, comprising:

a threshold circuit for determining whether or not the received signal is between upper and lower voltage thresholds; and a controller for outputting a LOS defect signal based on the determinations made by the detection circuit during a consecutive number of bit periods of a clock signal recovered from said received signal, wherein the threshold circuit generates an output having a first logic level when the received signal is not between the predetermined upper and lower threshold voltages and having a second logic level when the received signal is in between the predetermined upper and lower threshold voltages, wherein the controller is adapted to count data bit periods in consecutive blocks of N data bits, N being an integer, and to determine for substantially each of the blocks of N bits, a valid bit count equaling the number of data bit periods wherein the presence of the first logic level has been detected, and further adapted to control the state of the LOS defect signal according to predetermined criteria of the controller and the valid count.

30. An integrated circuit for receiving a signal of a digital data bit stream and detecting Loss of Signal (LOS) events, comprising:

a threshold circuit for generating an output signal having a low and high logic level, respectively, which indicates whether or not the received signal is between predetermined upper and lower voltage thresholds;

at least one Set-Reset Latch (SR-Latch) for detecting the presence of a high logic level in the detector output signal in each bit period of a clock signal recovered from the received signal, wherein an LOS event is detected based on whether or not the SR-Latch detects a high logic level in one or more bit periods of the recovered clock signal.

31. An integrated circuit according to claim 30, wherein each SR-Latch has a Set input terminal adapted to receive the threshold circuit output signal and a Reset terminal adapted to receive a SR clock signal operating synchronous with respect to the recovered clock signal to reset the at least one SR-Latch at the beginning of each new data bit period.

32. An integrated circuit according to claim 30, further comprising a controller for counting data bit periods in consecutive blocks of N data bits, N being an integer, and to determine for substantially each of the blocks of N bits, a valid bit count equaling the number of data bit periods in which the presence of the first logic level has been detected, wherein the controller detects an LOS event according to predetermined criteria of the controller and the valid bit count.

33. An integrated circuit according to claim 30, further comprising an equaliser circuit adapted to reshape the received signal to be provided to the threshold circuit.

34. An integrated circuit according to claim 30, wherein the integrated circuit is adapted to receive the electrical signal from an electrical cable communication channel.

35. An article of manufacture, comprising:

a machine accessible medium comprising content that when accessed by a machine causes the machine to:

recover a clock signal or a data bit signal of the digital data bit stream encoded or embedded in the digital data bit stream, compare a voltage level of the incoming electrical signal to an upper threshold voltage, provide a first comparator signal indicating whether the voltage level is larger or smaller than the upper threshold voltage, compare the input voltage level of the incoming electrical signal to the second threshold voltage, provide a second comparator signal indicating whether the voltage level is larger or smaller than the lower threshold voltage, process the first comparator signal and the second comparator signal to generate an detector output signal having a first logic level when the input signal level is larger than the upper threshold voltage or smaller than the lower threshold voltage, and to generate a second logic level when the input signal level is between upper and the lower threshold voltages, determine data bit periods of the incoming digital data signal by a controller receiving the recovered clock signal or data bit signal, detect, within each data bit period, the presence or absence of the first logic level in the detector output signal, and control a state of a LOS defect signal indicating absence or presence of the digital data stream based on detected first logic levels and predetermined criteria.

* * * * *

UNITED STATES PATENT AND TRADEMARK OFFICE
CERTIFICATE OF CORRECTION

PATENT NO.   : 6,438,178 B1   Page 1 of 1
DATED        : August 20, 2002
INVENTOR(S)  : Lysdal et al.

It is certified that error appears in the above-identified patent and that said Letters Patent is hereby corrected as shown below:

Column 8,
Line 16, delete "SRI" and insert -- SR --.

Column 14,
Line 14, delete "omparator" and insert -- comparator --.

Column 18,
Line 4, delete "TU-T" and insert -- ITU-T --

Signed and Sealed this

Twenty-first Day of September, 2004

JON W. DUDAS
*Director of the United States Patent and Trademark Office*